United States Patent [19]

Uihlen et al.

[11] Patent Number: 5,114,797

[45] Date of Patent: May 19, 1992

[54] METAL STRUCTURAL COMPONENT HAVING A HEAT INSULATING TITANIUM FIRE INHIBITING PROTECTIVE COATING

[75] Inventors: Thomas Uihlen, Dachau; Klaus Schweitzer, Niederpoecking, both of Fed. Rep. of Germany

[73] Assignee: MTU Motoren- und Turbinen-Union Muenchen GmbH, Munich, Fed. Rep. of Germany

[21] Appl. No.: 693,818

[22] Filed: Apr. 30, 1991

[30] Foreign Application Priority Data

May 10, 1990 [DE] Fed. Rep. of Germany ....... 4015010

[51] Int. Cl.$^5$ .......................... B22F 7/04; B32B 15/20
[52] U.S. Cl. .................... 428/553; 428/552; 428/554; 428/633
[58] Field of Search ............... 428/552, 553, 554, 632, 428/633

[56] References Cited

U.S. PATENT DOCUMENTS

| | | | |
|---|---|---|---|
| 3,517,428 | 6/1970 | Gadd | 428/553 |
| 3,573,963 | 4/1971 | Maxwell | 428/553 |
| 3,736,109 | 5/1973 | Darling et al. | 428/632 |
| 3,846,159 | 11/1974 | Bornstein et al. | 428/632 |
| 4,055,705 | 10/1977 | Stecura et al. | 428/633 |
| 4,255,495 | 3/1981 | Levine et al. | 428/632 |
| 4,752,535 | 6/1988 | Kvernes | 428/632 |
| 4,798,770 | 1/1989 | Donomoto et al. | 428/553 |
| 4,935,193 | 6/1990 | Grunke et al. | 427/12 |
| 5,006,419 | 4/1991 | Grunke et al. | 428/623 |

FOREIGN PATENT DOCUMENTS 3906187  10/1989  Fed. Rep. of Germany .

OTHER PUBLICATIONS

Article entitled: "Flame Rig Testing of Thermal Barrier Coatings and Correlation with Engine Results" by G. Johner and K. K. Schweitzer; J. Vac. Sci. Technol. A3 (6), Nov./Dec. 1985; 1985 American Vacuum Society, pp. 2516-2524.

*Primary Examiner*—Deborah L. Kyle
*Assistant Examiner*—Daniel J. Jenkins
*Attorney, Agent, or Firm*—W. G. Fasse

[57] ABSTRACT

A metal structure component is provided with a protective coating including three layers. A first layer on the surface of the metal structural component is a bond improving metallic base layer on which an intermediate heat insulating oxidic layer is applied, followed by a titanium fire inhibiting metallic cover layer. Due to this arrangement of three layers, it is possible for the advantageous characteristics of the individual layers to cooperate to provide a good bonding and heat insulating protection of the intermediate layer in combination with the titanium fire inhibiting protection of the outer layer, whereby the structural component achieves a prolonged operational life without a substantial weight increase as compared to conventional protection layers provided only for heat insulation purposes. This layer structure also minimizes any adverse influence on the structural strength of the metal structural component.

10 Claims, 1 Drawing Sheet

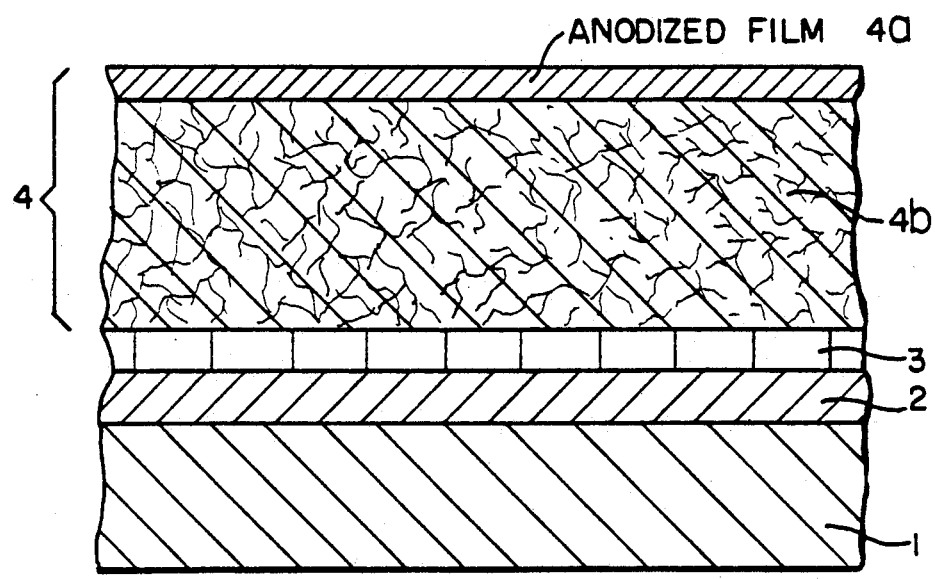

METAL STRUCTURAL COMPONENT HAVING A HEAT INSULATING TITANIUM FIRE INHIBITING PROTECTIVE COATING

FIELD OF THE INVENTION

The invention relates to metal structural components, for example, made of titanium alloys, which are provided with a heat insulating titanium fire inhibiting protective coating.

BACKGROUND INFORMATION

A publication entitled: Flame rig testing of thermal barrier coatings and correlation with engine results by G. Johner and K. K. Schweitzer discloses metal structural components provided with heat insulating protective layers of zirconium dioxide. A disadvantage of zirconium dioxide protective layers is seen in that due to the high density of zirconium dioxide and due to the required thickness of the layers, the total weight of the protected metal structural components is substantially increased by the protective layers. Further, in order to achieve the required thickness of the protective coating, several plasma sprayed layers must be applied, which results in high operational temperatures corresponding to those occurring in gas turbine power plants. These temperatures applied during the manufacturing phase lead to substantial material stress between the protective layers relative to one another and between the protective coating and the base material of which the metal structural component is made. As a result, the protective coating has a tendency to chip off layer by layer.

U.S. Pat. No. 5,006,419 (Grunke et al.) which is partially based on German Pat. Publication 3,906,187, discloses a titanium alloy structural component provided with a titanium fire inhibiting protective coating of aluminum. The protection mechanism which is achieved by the evaporation of aluminum has the drawback that the aluminum protective coating is used up in a rather non-uniform manner. As a result, it is possible that the protective coating has been locally eaten away completely while other areas are still properly protected against thermal loading. However, unprotected local areas of the structural component that requires protection against thermal loading, involve the danger of a restructuring of the microstructure by recrystallization near the surface or an ignition of the base material of which the metal structure compound is made, such as titanium alloy. A recrystallization or microrestructuring of the surface layer of the metal structural component due to local overheating results in a reduced material strength of the structural components. Thus, there is still room for improvement. U.S. Pat. No. 4,935,193 (Grunke et al.) discloses an improved coating of an aluminum niobium combination on the surface of a structural component of titanium or titanium alloys for protecting the component against oxidation.

OBJECTS OF THE INVENTION

In view of the above it is the aim of the invention to achieve the following objects singly or in combination:
to effectively protect metal structural components against localized overheating as may occur due to the effects of a titanium fire;
to reduce the repair and maintenance requirements so that such work can be performed at the end of longer time intervals as compared to conventional maintenance schedules;
to provide an efficient and cost effective method for producing such structural components, or rather for providing such metal structural components with effective protective coatings:
to provide a protective coating with a layer arrangement which will not adversely affect the mechanical characteristics of the structural components on the one hand, while still being thick enough to provide an efficient protection against a titanium fire attack; and
to avoid the above mentioned stress that can result due to the layer formation of the protective coating and to avoid localized wear out and chipping of the protective coating.

SUMMARY OF THE INVENTION

The above objects have been achieved according to the invention by a combination of three layers on the surface of the component to be protected. The first layer is a bonding increasing metallic base layer. The second layer is a heat insulating oxide intermediate layer. The third or top layer is a titanium fire inhibiting metallic cover layer.

The combination of three layers according to the invention has the advantage that the titanium fire inhibiting characteristics of the top layer are combined with the heat insulating characteristics of the intermediate layer and with the bond increasing characteristics of the first or base layer. The cooperation of these characteristics results in a protective coating that has a prolonged operational life in its protection of the metal structural components, while hardly increasing the total weight of the metal structural components as compared to heat insulating layers capable of only providing heat insulation. Another advantage is seen in that the adverse influences in localized areas that could be caused by titanium fires, are substantially reduced according to the invention, as compared to a protective coating that is only constructed to provide protection against titanium fires. The improvement in the operational life of the protective coating according to the invention has economic advantages because repair and maintenance intervals can now be longer than has been possible heretofore.

According to a preferred embodiment of the invention the metal structural component is made of a titanium base alloy and the bonding increasing first or base layer is a nickle alloy layer comprising preferably 2 to 10% by weight of aluminum in the nickel base. Such a base layer has the advantage that it has a rough surface so that the bonding of the intermediate layer to the base layer and to the metal surface of the structural component is improved. The intermediate layer is preferably made of a zirconium dioxide which is at least partly stabilized by 6 to 8% by weight of an yttrium oxide. The intermediate layer has a thickness within the range of 50 to 300 $\mu$m so that material stresses between the metal structural component surface and the heat insulating oxidic intermediate layer are compensated. The just mentioned composition of the heat insulating intermediate layer has the advantage that it cooperates with the titanium fire inhibiting top layer of the entire coating in providing an increased thermal-shock resistance. The yttrium oxide has the advantageous effect of partially stabilizing the tetragonal phase of the zirconium dioxide so that the thermally caused volume jump to the monokline phase is partially suppressed.

An improved embodiment of the intermediate heat insulating layer has a layer thickness of 10 to 100μm. Such thin intermediate layers have the advantage that even if the thermal loading is high, the intermediate layer remains tenaciously bonded to the base layer to provide a sufficient heat insulating protection when a titanium fire attack takes place.

The intermediate layer is preferably formed as a single-ply layer so that material tensions that can occur if multi-ply structures are used, are avoided.

Aluminum for use in the outer titanium fire inhibiting layer has the advantage that, with regard to metals, it has a low evaporation temperature, while simultaneously requiring a high evaporation heat application so that aluminum is a preferred material for forming the outer titanium fire inhibiting layer.

A preferred layer thickness for the outer titanium fire inhibiting cover layer within the range of 1 to 2mm has the advantage that such a layer is not too thick and hence does not adversely affect or impair the mechanical characteristics of the structural components on the one hand, while on the other hand, the mentioned thickness range of 1 to 2mm is thick enough for providing a sufficient mass for evaporation in case of a titanium fire attack.

Preferably, the outer aluminum cover layer has embedded therein aluminum oxide lamellae which reduces the danger of a complete localized evaporation of the titanium fire inhibiting outer layer. The aluminum oxide lamaelle are horizontally oriented in the outer cover layer.

The outwardly facing surface of the outer cover layer is preferably provided with an anodized film which seals and protects the surface of the outer aluminum layer against oxidation.

The protective coating of the invention is applied according to the invention by the following sequence of steps. The metal structural component is first heated to a temperature within the range of 100° to 180° C. in an oxidizing atmosphere, whereupon the base layer, the intermediate layer, and the cover layer are applied by thermal spraying in the mentioned sequence. This sequential layer application has the advantage that the entire layer structure from the base layer to the covering layer can be applied in the same apparatus so that the metal structural component needs to be prepared for the layering operation only once. Further, the layer application can take place in an oxygen containing atmosphere so that it is not necessary to perform the layer application in a vacuum nor even in a protective gas atmosphere which is very cost effective, particularly for mass produced items.

The oxygen containing atmosphere used for the spray application of a titanium inhibiting cover coating made of an aluminum base material has the further advantage that the horizontally arranged aluminum oxide lamaelle are incorporated into the outer protective coating. Another advantage is seen in that a defined "let in" intermediate layer is also effectively produceable by this method in a cost effective manner.

BRIEF DESCRIPTION OF THE DRAWING

In order that the invention may be clearly understood, it will now be described, by way of example, with reference to the single FIG. of the accompanying drawing, which shows a sectional view, on an enlarged scale, through a metal structural component surface protected as taught herein.

DETAILED DESCRIPTION OF A PREFERRED EXAMPLE EMBODIMENT AND OF THE BEST MODE OF THE INVENTION

As shown in the FIG., the metal structural component 1 is provided with a three-ply or three layer protective coating that includes a bonding improving metallic base layer 2, a heat insulating oxide intermediate layer 3, and a titanium fire inhibiting metallic cover layer 4. The cover layer 4 may be provided with an anodized film 4a on its surface. The base material of the metal structural component 1 is preferably titanium base alloy. The bonding improving base layer 2 is formed as a nickel alloy layer comprising about 5% by weight of aluminum. The bonding layer 2 is thermally sprayed onto the surface of the component 1. An intermediate heat insulating layer 3 of zirconium dioxide containing 7% by weight of yttrium oxide, is applied on the surface of the base layer 2 to an extent that the intermediate layer 3 has a thickness of, for example. 50 μm. The last and outer protective layer 4 against titanium fires has a thickness of, for example, 1.5mm, and it is thermally sprayed in an oxygen containing atmosphere so that inside the structure of the layer 4 aluminum oxide lamellae 4b are embedded which are preferably distributed substantially in parallel to the surface of said structural component.

The base layer 2 for providing an improved bonding between the component surface and the protective coating, may be made by thermal spraying of a material selected from NiAl, NiCrAl, and MCrAlX, wherein M is selected from the group of copper and/or nickel, and wherein X is selected from the group of Y, Hf, and/or any rare earth metal.

Although the invention has been described with reference to specific example embodiments it will be appreciated that it is intended to cover all modifications and equivalents within the scope of the appended claims.

What we claim is:

1. A metal structural component, comprising a protective coating on its surface, said protective coating comprising a first metallic base layer (2) intimately bonded to said surface of said structural component, a second intermediate heat insulating single ply oxidic layer (3) covering said base layer (2), said base layer providing a tenacious bonding between said intermediate heat insulating layer (3) and said structural component, and a third metallic cover layer (4) on said intermediate layer, said third metallic cover layer comprising aluminum oxide lamellae uniformly distributed and embedded inside said cover layer, whereby a three layer structure is formed for inhibiting titanium fires.

2. The metal structural component of claim 1, wherein said first metallic base layer (2) is made of a nickel aluminum alloy comprising 2 to 10% by weight of aluminum, the remainder being nickel.

3. The metal structural component of claim 1, wherein said first metallic base layer (2) is a sprayed layer applied by thermal spraying, said sprayed layer being made of a material selected from the group consisting of NiAl, NiCrAl, and MCrAlX, wherein M is selected from the group consisting of Co and Ni, and wherein X is selected from the group consisting of Y, Hf, and a rare earth metal.

4. The metal structural component of claim 1, wherein said first metallic base layer (2) has a thickness within the range of 50μm to 300μm.

5. The metal structural component of claim 1, wherein said second intermediate heat insulating oxidic layer (3) is made of zirconium oxide including yttrium oxide within the range of 6 to 8% by weight for a partial stabilization of said zirconium oxide.

6. The metal structural component of claim 1, wherein said second intermediate heat insulating oxidic layer (3) has a thickness within the range of 10μm to 100μm.

7. The metal structural component of claim 1, wherein said third metallic cover layer (4) is made of aluminum.

8. The metal structural component of claim 1, wherein said third metallic cover layer (4) has a thickness within the range of 1 to 2mm.

9. The metal structural component of claim 1, wherein said third metallic cover layer comprises an anodized cover film of aluminum oxide.

10. The metal structural component of claim 1, wherein said aluminum oxide lamellae uniformly distributed inside said cover layer extend substantially in parallel to the surface of said structural component.

* * * * *

UNITED STATES PATENT AND TRADEMARK OFFICE
CERTIFICATE OF CORRECTION

PATENT NO. : 5,114,797
DATED : May 19, 1992
INVENTOR(S) : Thomas Uihlein, Klaus Schweitzer It is certified that error appears in the above-identified patent and that said Letters Patent is hereby corrected as shown below:

In the title page, Item

[19], please correct the spelling of the first inventor's name to read: --Uihlein et al.--.

[75], please correct the spelling of the first inventor's name to read: --Thomas Uihlein--.

Signed and Sealed this

Thirteenth Day of July, 1993

Attest:

MICHAEL K. KIRK

Attesting Officer

Acting Commissioner of Patents and Trademarks